Patented Apr. 12, 1949

2,466,810

UNITED STATES PATENT OFFICE 2,466,810

PRESERVATION OF SYNTHETIC RUBBER WITH AROMATIC ARSENITES

Louis H. Howland, Watertown, and Byron A. Hunter, Naugatuck, Conn., assignors to United States Rubber Company, New York, N. Y., a corporation of New Jersey No Drawing. Application March 26, 1946, Serial No. 657,342

5 Claims. (Cl. 260—45.95)

This invention relates to the preservation of synthetic rubber-like (elastomeric) materials which are denoted broadly as diene polymers (including copolymers), and more particularly those derived from the modified 1,3-diene polymers which are formed from the polymerization of conjugated dienes with compounds of the structure

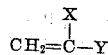

where X is hydrogen or methyl; and Y is CN, phenyl or methyl, which includes especially those butadienoid polymers known to the trade as Buna S (GRS), Buna N (GRN), Butyl (GRI), Chemigum, Hycar OR, etc. The elastomeric polybutadienes and polychloroprene (neoprene) are also included within the scope of the invention.

An object of the invention is to provide chemicals which, although having practically no value as antioxidants for natural rubber, nevertheless will outstandingly preserve said synthetic rubber-like materials, and particularly those derived from 1,3-dienes, against deterioration induced before vulcanization, by oxygen, heat, or light. A further object is to provide a class of compounds which may be added to white or light-colored synthetic rubber stocks without producing bad discoloration when the compositions containing them are exposed to the action of sunlight. A still further object is to provide chemicals which protect the unvulcanized diene-vinyl compound copolymers against the deleterious effects of heat when such polymers are subjected to elevated temperatures during processing. Another object is to provide chemicals which have special and outstanding properties in connection with the preservation of diene-vinyl compound copolymers. Still other objects will be apparent from the following description.

We have found that these objects may be attained if there is incorporated into the synthetic rubber an aromatic ester of arsenious acid having the general formula

where As represents arsenic, and $R_1$, $R_2$, and $R_3$ represent similar or dissimilar aromatic groups.

Exemplary of such chemicals are: triphenyl arsenite, tri-o-tolyl arsenite, tri-m-tolyl arsenite, tri-p-tolyl arsenite, tri-alpha-naphthyl arsenite, tri-beta-naphthyl arsenite, tri-xenyl arsenite, tri-2, 5-dimethyl phenyl arsenite, tri-o-cresyl arsenite, tri-(p-tert.-butyl phenyl) arsenite, tri-(2,4-ditert.-butyl phenyl) arsenite, and tri-(4-methyl-2,6-ditert.-butyl phenyl) arsenite.

The chemicals of the invention may be made by any method known to the art. A convenient method for preparing said arsenites is described by P. Fromm, Ber. 28, 620 (1895).

The various synthetic elastomers are known by the art to be produced in various manners, including those shown in U. S. Patents Nos. 1,973,000 and 1,938,731. The present invention, however, is not concerned with the particulars of producing these elastomers but in their preservation, as aforesaid.

For the purpose of illustrating the best modes of the invention, examples of a 1,3-butadiene-styrene copolymer (GRS) containing aromatic esters of arsenious acid are given for showing the beneficial protective effects to be obtained from the use of such chemicals; the parts being by weight:

Example 1

To 100 parts of 75-butadiene-25-styrene emulsion copolymer rubber, 2 parts of triphenyl arsenite are incorporated in a rubber mill in the usual manner. A sample of this rubber mix is placed in an oven at 212° F. along with a sample of the same butadiene-styrene copolymer which contains no triphenyl arsenite. Both samples were examined after 24 hours. The sample containing the triphenyl arsenite is unchanged in appearance while the unstabilized sample forms a hard surface film which cracks on bending. Both samples are replaced in the oven and heated at 212° F. for 400 hours, being inspected periodically. The surface film of the unstabilized sample becomes progressively harder and deeper whereas the sample containing triphenyl arsenite shows no visible deterioration and remains the same in appearance as the unaged polymer. Indeed, after 400 hours in the oven, the sample containing triphenyl arsenite remains unaffected and shows no visible degradation.

Example 2

In order to show the non-discoloring properties of aryl arsenites, synthetic rubber compositions are made up according to the following recipe:

|  | Stock A | Stock B |
|---|---|---|
| Butadiene-styrene copolymer | 100.0 | 100.0 |
| Zinc oxide | 10.0 | 10.0 |
| Lithopone | 50.0 | 50.0 |
| Whiting | 75.0 | 75.0 |
| Paraffin oil | 5.0 | 5.0 |
| Sulfur | 2.0 | 2.0 |
| Mercaptobenzothiazole | 2.0 | 2.0 |
| Tetramethyl thiuram monosulfide | 0.1 | 0.1 |
| Triphenyl arsenite | 2.0 | |

Stocks A and B are mixed individually on a rubber mill and cured for 45 minutes at 45 lbs. steam pressure. Test pieces are cut from both stocks and mounted for exposure to sunlight. Strips of cotton cloth and of lacquered tape are placed in contact with parts of the exposed test pieces for observation of staining characteristics. After 6 days exposure to the direct rays of the sun, stocks A and B are identical in color, each stock remaining light in color. The strips of cotton cloth and lacquered tape are not discolored by contact with either stock. These results conclusively show that triphenyl arsenate is non-discoloring and non-staining, the stock containing the stabilizer being equally good in color as that of the rubber stock containing no stabilizer.

It can be seen from these results that the compounds of this invention are extremely effective in overcoming the deterioration of diene-vinyl compound copolymers due to heat and oxidation. Furthermore, these results show that these deterioration inhibitors are essentially non-discoloring to white or light-colored stocks and are thereby suitable for use in either white or light colored synthetic rubber articles although they may be used in any color and type of rubber article.

The deterioration inhibitors of this invention may be used alone in the synthetic rubber composition or may be mixed with other preservatives, fillers, accelerators, vulcanizing agents, or compounding agents of any sort known to the art. The components of the synthetic rubber composition may be used in various ratios and it is not intended to limit the invention to the amounts of ingredients indicated in the examples given.

The age resistors of the invention may be incorporated into the synthetic rubber by milling or similar process, or by mixing with the synthetic rubber latex before or during coagulation, or application thereof may be made to the surface of the crude polymer or of the vulcanized product. The amount of the age resistor may vary, economical proportions ranging from 0.25 part to 5.0 parts by weight, based on 100 parts by weight of the elastomer base.

Synthetic rubber goods of various descriptions may have their useful life prolonged by the practice of this invention, including tubes, hose, wire, insulation, boots and shoes, surgical instruments, drug sundries, dipped synthetic rubber articles, vehicle tires, etc.

Having thus described our invention, what we claim and desire to protect by Letters Patent is:

1. A synthetic rubbery copolymer of 1,3-butadiene with a compound of the formula $$CH_2=C\underset{Y}{\overset{X}{|}}$$

where X is hydrogen and Y is a radical from the class consisting of CN and phenyl, containing a compound having the general formula

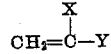

where As represents arsenic, and $R_1$, $R_2$, and $R_3$ each represent an aromatic hydrocarbon group, in a small but effective amount sufficient to preserve the said rubbery polymer.

2. A rubbery 1,3-butadiene-styrene copolymer which comprises a compound having the general formula

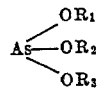

where As represents arsenic, and $R_1$, $R_2$, and $R_3$ each represent an aromatic hydrocarbon group in a small but effective amount sufficient to preserve the said copolymer.

3. A rubbery 1,3-butadiene-acrylonitrile copolymer which comprises a compound having the general formula

where As represents arsenic, and $R_1$, $R_2$, and $R_3$ each represent an aromatic hydrocarbon group in a small but effective amount sufficient to preserve the said copolymer.

4. A rubbery 1,3-butadiene-styrene copolymer which comprises a triphenyl arsenite, in an amount sufficient to preserve the copolymer.

5. A rubbery 1,3-butadiene-acrylonitrile copolymer which comprises a triphenyl arsenite, in an amount sufficient to preserve the copolymer.

LOUIS H. HOWLAND.
BYRON A. HUNTER.

REFERENCES CITED

The following references are of record in the file of this patent:

UNITED STATES PATENTS

| Number | Name | Date |
|---|---|---|
| 2,252,318 | Gravell | Aug. 12, 1941 |
| 2,289,195 | Howland | July 7, 1942 |
| 2,314,466 | Thwaites | Mar. 23, 1943 |